United States Patent
Earp

[15] 3,670,338
[45] June 13, 1972

[54] RADIO NAVIGATION RECEIVING EQUIPMENT

[72] Inventor: Charles William Earp, Hampstead, London, England

[73] Assignee: International Standard Electric Corporation, New York, N.Y.

[22] Filed: Feb. 9, 1970

[21] Appl. No.: 9,802

[30] Foreign Application Priority Data

March 7, 1969 Great Britain......................12,225/69

[52] U.S. Cl. ....................343/108 M, 343/106 D, 343/112 D
[51] Int. Cl............................................................G01s 1/40
[58] Field of Search........................343/108 M, 112 D, 106 D

[56] References Cited

UNITED STATES PATENTS 3,234,554 2/1966 Earp et al..........................343/108 M
3,290,685 12/1966 Steiner........................343/108 M X Primary Examiner—Benjamin A. Borchelt
Assistant Examiner—Richard E. Berger
Attorney—C. Cornell Remsen, Jr., Walter J. Baum, Paul W. Hemminger, Percy P. Lantzy, Philip M. Bolton, Isidore Togue and Charles L. Johnson, Jr.

[57] ABSTRACT

A beacon which simulates a moving source provides signals from which, at a receiver, there is determined in terms of frequency the distance and angle of elevation from the receiver to the beacon. In the receiver, the frequency information is used to define a non-rectilinear glide path or approach track for an aircraft. This is achieved with summing and multiplying equipment in a defined relationship.

11 Claims, 8 Drawing Figures

Inventor
CHARLES W. EARP

Inventor
CHARLES W. EARP

Inventor
CHARLES W. EARP

RADIO NAVIGATION RECEIVING EQUIPMENT

BACKGROUND OF THE INVENTION

This invention relates to radio navigation systems, and particularly to radio navigation receiving equipment.

In aircraft approach systems, an important growing requirement is for the provision of approach tracks which are not simple straight lines. For example, jet-propelled aircraft require to make the final approach with a low angle of glide, say 2½°, but because of noise and other factors, it is necessary to make an earlier controlled descent at a much greater angle. Another example is the requirement for provision of accurate guidance over a wide range of approach angles to a final single approach track in exact line with the runway.

SUMMARY OF THE INVENTION

An object of the invention is to provide an aircraft approach system fulfilling the above-mentioned requirements.

According to the invention there is provided radio navigation receiving equipment for use with a transmitting station providing rectilinear constant velocity motion of a radio-frequency radiating source, said receiver including means for determining in terms of frequency and each as a function of the Doppler frequency shift of the frequency radiated by the source the direction and the distance of the receiver with respect to the transmitting station and means responsive to received direction and distance determining frequencies lying within a first predetermined range of direction and distance frequencies to define a non-radial track with respect to the transmitting station.

BRIEF DESCRIPTION OF THE DRAWINGS

Preferred embodiments of the invention will now be described with reference to the accompanying drawings, in which.

DESCRIPTION OF THE PREFERRED EMBODIMENTS

Figure 1:
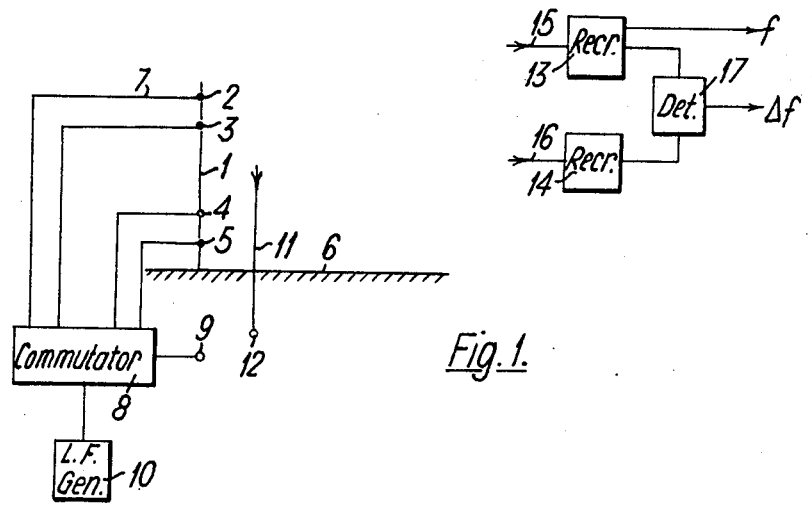
FIG. 1 is a schematic diagram of an aircraft approach system for a two-slope or graded-slope glide-path, having a single ground beacon, and two receivers.

Referring to FIG. 1, the ground beacon comprises an aerial array 1 which has a number of equally spaced radiating elements, some of which are shown at 2, 3, 4 and 5, which are vertically stacked above the ground, indicated by a horizontal line 6.

Each of the elements in the array 1 is connected by a feeder, such as 7, to a commutator arrangement 8. The commutator 8 is connected at point 9 to a source of radio frequency energy (not shown) and to a low frequency generator 10.

Also located at the ground beacon is a single (reference) aerial 11 positioned at such a height above the ground plane 6, and if necessary being provided with counterpoises, that its signal is radiated over the whole service volume of the beacon. The aerial 11 is connected at point 12 to a source of radio frequency energy (not shown).

Mobile (aircraft mounted) radio receiving equipment, comprises two separate receivers 13 and 14 whose respective single aerials 15 and 16 are spaced in the same sense as the beacon array, i.e., vertically one above the other.

The beacon may be operated in two ways, both involving commutation (at a rate controlled by the low frequency generator 10) of radio frequency energy to the elements of the array to simulate rectilinear constant velocity motion of a radiating source.

In the first method of operation, frequency $F_a$ (for example 1 GHz) is fed via point 9 for commutation to the elements of the array so as to simulate unidirectional vertical movement, upwards only or downwards only, of a radiating source of continuous wave at frequency $F_a$. Simultaneously, frequencies $F_a$ and $F_a + \delta F_a$ (where $\delta F_a$ is very small compared with $F_a$) are fed via point 12 for radiation by the reference aerial 11.

Due to the simulated unidirectional movement of the radiating source, a Doppler frequency shift (positive for upward movement or negative for downward movement) is imposed on the direct path signal as received by the aircraft, where one of the receivers, say 13, utilizes this signal, by extraction of the Doppler frequency shift, to measure the angle of elevation of the aircraft with respect to the ground beacon by the proportionality of the elevation angle to the beat frequency. This glide-path system is more fully described in our copending application Ser. No. 859,915 filed Sept. 22, 1969.

The direct path signal, as received by each of the aircraft receivers 13 and 14, is utilized to measure the distance of the aircraft from the ground beacon. This distance measuring technique as more fully described in our copending application Ser. No. 4,653 filed Jan. 21, 1970 but basically the receiving equipment further includes means 17 for determining the difference between the two beat note frequencies extracted one at each receiver, from the two received frequencies at each receiver. Distance from the beacon is the reciprocal of the difference between the separate beats from the two receivers.

In the second method of operation of the ground beacon, commutation of a radiofrequency to the elements of the array is bi-directional so as to simulate rectilinear constant velocity to-and-fro motion of a radiating source. Simultaneously radiofrequency energy is radiated from the reference aerial this reference frequency differing by a fixed amount from the commutated frequency, and the sign of the frequency difference is changed in sign at each half-period of commutation to the array, i.e., the sign is changed at each sweep reversal to prevent the opposite directions of sweep producing opposite Doppler frequency displacement of the radiated signal.

This is more fully described in our copending application Ser. No. 4,653 filed Jan. 21, 1970 but basically, with bi-directional scanning, the beacon may be operated in any of the following ways.

1. Reference aerial 11, constant frequency $F_b$. Commutated radiation to array 1 either frequency $F_b - \delta F_b$ for one direction of sweep changing to $F_b + \delta F_b$ for the other direction of sweep, or vice versa. 2. Commutated radiation to array 1, constant frequency $F_b$. Reference aerial 11, either frequency $F_b - \delta F_b$ during one direction of sweep of the commutation of the array changing to $F_b + \delta F_b$ for the other direction of sweep, or vice versa.

3. Reference aerial 11, frequency $F_b - \delta F_b$ during one direction of sweep changing to $F_b + \delta F_b$ for the other direction. Commutated radiation to array 1, frequency $F_b + \delta F_b$ during one direction of sweep changing to $F_b - \delta F_b$ for the other direction. } or vice versa The third arrangement is preferred, since it involves radiation of two frequencies only.

The required frequencies in practice are derived from a single radiofrequency source with means for generating upper and lower sidebands, with suitable switching means for applying the appropriate frequencies as required according to the particular method of operating the bi-directionally scanned array.

As for the unidirectionally swept beacon, distance from the beacon is the reciprocal of the difference between the separate beats from the two receivers.

Both measurements, i.e., elevation angle and reciprocal of distance, being made in terms of the well-defined parameter frequency, permit the use of relatively simple processing techniques to provide tracks of any desired shape.

Figure 2:
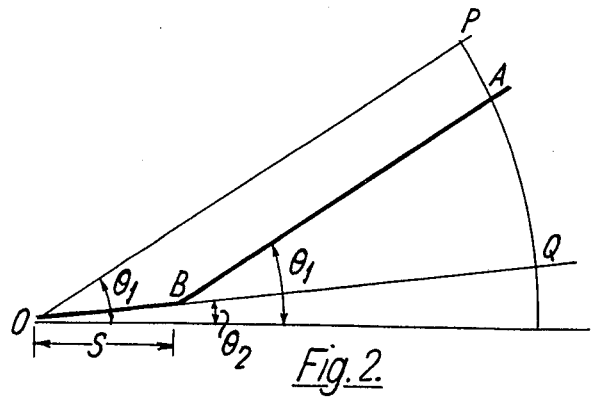
FIG. 2 shows a typical two-slope glide path.

Referring now to FIG. 2, let it be supposed that a glide-path is required to have an original glide angle of $\theta_1$, until approach to a specified distance S from the beacon, then to descend on a straight track to the beacon at a reduced angle $\theta_2$. In FIG. 2 the beacon is at O, and ABO is the required glide-path. AB is non-radial with respect to the beacon, and BO is radial with respect to the beacon.

If the elevation angle is measured as frequency in one receiver (13), and $\Delta f$ is the differential beat between two outputs from the two receivers 13 and 14 spaced one above the other, then $\Delta f$ is proportional to the reciprocal of distance.

Let $f_1$ be the 'elevation-beat' along the line OP, corresponding to $\theta_1$, and $f_2$ the 'elevation-beat' along the line OQ, corresponding to $\theta_2$.

A constant $K$ is chosen so that at distance S from the beacon, that is at point B, $$K \cdot \Delta f = f_1 - f_2$$

Then at point B, $$\text{measured } f = f_2 = f_1 - K\Delta f$$

Thus, over the whole length AB, $f = f_1 - K\Delta f$, and from B to O, $f = f_2$.

Figure 3:
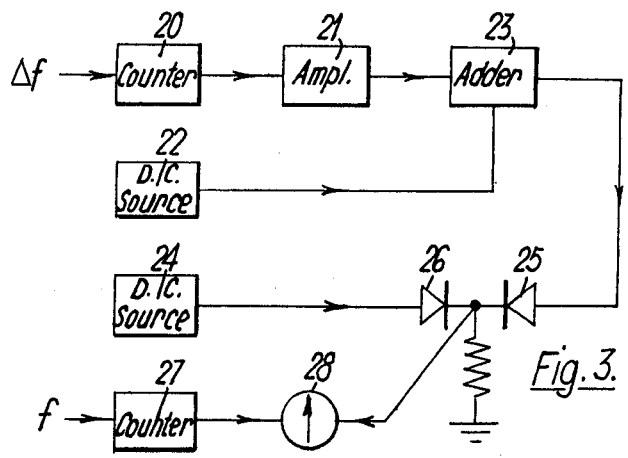
FIG. 3 is a block schematic diagram of path of radio receiving equipment of the approach system.

FIG. 3 shows the receiving equipment components to implement the required glide track.

20 is a counter of $\Delta f$, giving a negative D.C. voltage representation of $\Delta f$.

21 is an amplifier, adjustable to amplify the output from 20 $K$ times.

22 is adjustable to give a positive D.C. voltage representation of $f_1$.

23 is an adder, with inputs from 21 and 22, giving as output a positive voltage representation of $f_1 - K\Delta f$.

24 is adjustable to give a positive D.C. voltage representation of $f_2$.

Two rectifiers 25 and 26 select the greater of the outputs from 23 and 24.

27 is a counter of f giving a positive voltage representation of $f$.

Glide-meter 28, a center-reading D.C. instrument has inputs from the selector 25, 26 and from counter 27, and indicates any substantially linear angular departures from the selected glide-path ABO of FIG. 2.

This glide-path as defined is made up almost exactly of two straight lines. If there is a requirement for a less abrupt change of slope, this could readily be made by using a different function of $\Delta f$, instead of the simple linear function $K\Delta f$.

For example, if $K$ is chosen so that $K \cdot \sqrt{\Delta f} = f_1 - f_2$ at the point B, then the use of $K \cdot \sqrt{\Delta f}$ instead of $K\Delta f$ in the circuit of FIG. 3 would provide a very small change in the linearity of glide angle between A and B, but a much less abrupt change of slope at B.

The value $\Delta f$ representative of reciprocal of distance can be obtained from a beacon other than the glide-beacon itself. Distance measurement can be made from two receivers of horizontal spacing, deriving the necessary signals from a horizontal approach beacon with its broadside direction in line with the aircraft approach track.

Figure 4:
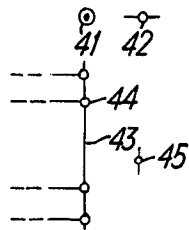
FIG. 4 is a schematic diagram of an aircraft approach system for a two-slope or graded-slope glide-path, having two ground beacons and two receivers.
Figure 4:
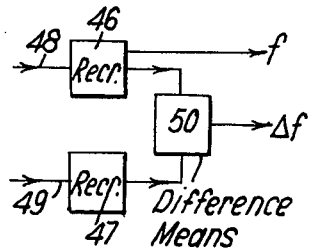

This is illustrated in FIG. 4, in which there is a glide beacon comprising a vertical array 41 and a reference aerial 42 and operating in any of the ways already described for the beacon of FIG. 1, and a horizontal array 43 of equally spaced aerials 44 and a reference aerial 45.

The horizontal approach beacon may be operated in any of the ways already described for the beacon of FIG. 1, the only difference being that simulation of rectilinear constant velocity motion of a radiating source, unidirectionally or bi-directionally is in the horizontal plane.

Two separate receivers 46 and 47 in the aircraft are arranged with their respective aerials 48 and 49 spaced in the same sense as the approach beacon 43, i.e., with horizontal spacing between the aerials. One of the receivers (46) is utilized to derive the frequency representing the elevation angle from the signals received from the glide-beacon, and the frequency difference from means 50 between the two beat note frequencies one from each receiver, from the signals from the horizontal approach beacon.

As a further alternative, the measurement of reciprocal of distance can be made from a single receiving aerial if the necessary signals are derived from spaced ground beacons.

Figure 5:
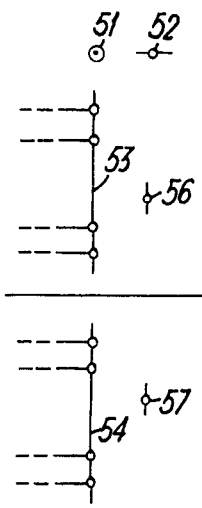
FIG. 5 is a schematic diagram of an aircraft approach system for a two-slope or graded-slope glide-path, having three ground beacons and a single receiver.

This is shown in FIG. 5. There is a vertically commutated aerial array 51 of the glide-beacon with its reference aerial 52 and operating in any of the ways already described, and two in-line separate horizontal arrays 53 and 54 spaced on either side of the line 55 of final approach each horizontal array having its reference aerial 56 and 57 respectively. The two in-line arrays each have equally spaced aerials and radiofrequency energy is commutated synchronously to the two horizontal arrays in any of the ways already generally described for the glide-beacon.

The two horizontal arrays can each radiate a different pair of radiofrequencies, but are preferably arranged to radiate the identical beat frequency $f_0$ in their respective broadside directions, and to have the same frequency displacement of $f_0$ according to sine of angle of displacement.

In the aircraft only a single receiver 58 is required. At this single receiver, the angle of elevation is determined by signals from the glide-beacon as elevation-beat $f$.

If $f_1$ is the beat frequency received from one of the horizontal arrays and $f_2$ is the beat frequency received from the other horizontal array then $(f_1 - f_2)$ is the reciprocal of distance from the beacon.

In the circuit of FIG. 3, with the system of FIG. 5, elevation beat $f$ is as already described, and $(f_1 - f_2)$ corresponds to $\Delta f$.

In FIG. 2, the setting up of the required glide path in terms of initial elevation angle $\theta_1$, with change to elevation angle $\theta_2$ at a distance S from the beacon, is achieved by appropriate setting of the amplifier 21 for $K$ $(\alpha s)$ and of $f_1$ $(\alpha \theta_1)$ at 22 and $f_2$ $(\alpha \theta_2)$ at 24.

Considering now the requirement for provision of accurate guidance for aircraft entering a 'funnel' which must be located at some distance from the landing field, before entering the specific straight track in line with the runway, this requirement cannot always be met by the use of a remote beacon at the apex of the funnel as, apart from cost, there may be no suitable site available.

However, when an approach beacon is able to code, by frequency a wide rage of azimuth with great precision and also provide a measurement of distance, it is possible to define a wide range of non-linear approach paths by the same principle as that already described for a two-slope guide beacon.

A single linear horizontal array of aerials to which signals are commutated, provides azimuth in terms of frequency, and horizontally spaced aerials on an approaching aircraft could permit measurement of $\Delta f$ to provide reciprocal of distance.

In order to avoid the necessity for two separate receiver aerials, however, the beacon is preferably composed (FIG. 6) of two in-line separate arrays 61 and 62 spaced on either side of the line 63 of final approach, each array having equally spaced aerials. There are reference aerials 64 and 65, one for each array.

Signal commutation is unidirectional (as already described) to the equally spaced aerials of each array and synchronous for the two arrays.

The two arrays plus reference aerials each radiate a different pair of radio-frequencies, but are preferably arranged to radiate the identical beat frequency $f_0$ in their respective broadside directions, and to have the same frequency displacement of $f_0$ according to sine of angle of displacement.

Figure 6:
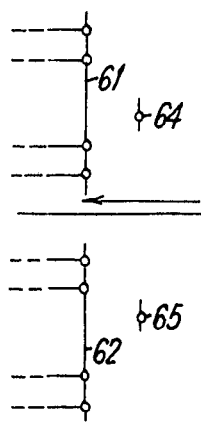
FIG. 6 is a schematic diagram of an aircraft approach system providing a 'ghost' beacon for funneling of aircraft to a final single approach track.

FIG. 6 also indicates the funneling of a number of different approach tracks 64 to a common point D at a distance T from the beacon.

There is a single receiver 65 in the aircraft. At this receiver let $f_1$ be the beat frequency received from one array, and $f_2$ the beat frequency from the other.

Then $(f_1 + f_2)$, codes bearing angle, and $(f_1 - f_2)$ codes reciprocal of distance.

Reciprocal of distance, as measured by $(f_1 - f_2)$ shows some small error with variable azimuth, but this is of little significance.

When comparing this approach track system with the glide path system already described, $(f_1 + f_2)$ corresponds to the frequency $f$, and $(f_1 - f_2)$ corresponds to $\Delta f$.

Figure 7:
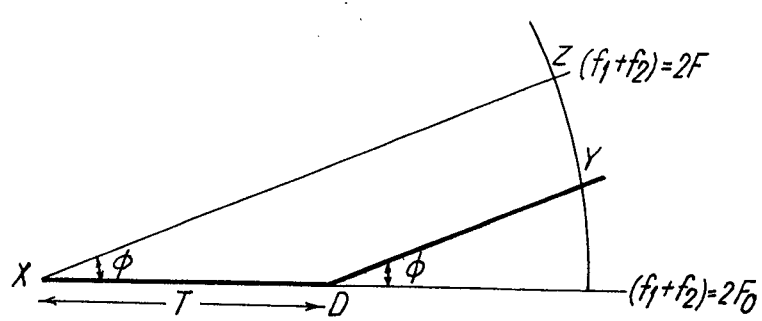
FIG. 7 shows how a funneled approach track is defined.

Referring now to FIG. 7, let it be supposed that the desired approach track is YDX, where YD is at an angle $\phi$ with respect to the final approach DX. YD is a non-radial track with respect to the beacon (at X), and DX is a radial track with respect to the beacon.

Figure 8:
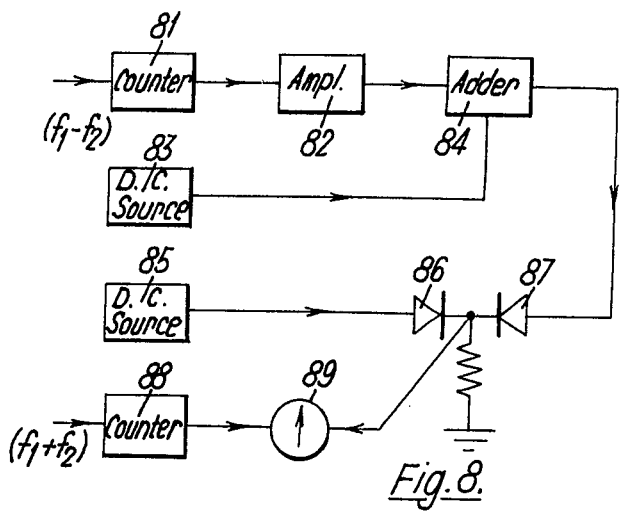
FIG. 8 is a block schematic diagram of part of radio receiving equipment of the system of FIG. 6.

In the receiver circuit shown in FIG. 8, 81 is a counter giving a negative D.C. voltage representation of the frequency $(f_1 - f_2)$ as received by the approaching aircraft. Amplifier 82 amplifies the output from 81 by $K$, $K$ being chosen so that at D at distance T from the beacon, $$K \cdot (f_1 - f_2) = 2F - 2F_0$$

where $2F$ is the value of $(f_1 + f_2)$ which would be received along the bearing XZ, and $2F_0$ is the value of $(f_1 + f_2)$ which would be received along the bearing XD.

83 is adjustable to give a positive D.C. voltage representation of $2F$.

84 is an adder, with inputs from 82 and 83 giving a D.C. voltage representation of $2F - K(f_1 - f_2)$.

85 is adjustable to give a positive D.C. voltage representation of $2F_0$.

Two rectifiers 86 and 87 select the greater of the outputs from 84 and 85. (The sense of the rectifiers would both be reversed to select the smaller of the outputs from 84 and 85 when angle $\phi$ is required to be negative.)

88 is a counter of the received $(f_1 + f_2)$ giving a positive voltage representation of $(f_1 + f_2)$.

Track meter 89, a center reading D.C. instrument, has inputs from the selector 86, 87 and from counter 88 and defines the tracks YDX, determined according to the pre-setting of 83 (for initial approach track bearing), 85 (for final approach track bearing) and 82 (for distance from beacon at which change is made from initial bearing to final bearing).

It is to be understood that the foregoing description of specific examples of this invention is made by way of example only and is not to be considered as a limitation on its scope.

I claim:

1. A radio navigation system having a physically fixed transmitting station programmed to radiate a first radiofrequency energy signal from a first antenna and a reference radiofrequency signal from a second antenna, including means for commutating energy among the elements of said first antenna to simulate rectilinear radiating source motion at substantially constant velocity, comprising the combination of:
    receiving means responsive to said first and reference radio signals at a remote mobile station, for generating direction and distance signals, the frequencies of said direction and distance signals being a function of the Doppler shift of said first signal due to said commutation and representing the direction and distance of said mobile station from said transmitting station;
    and track computing means responsive to said direction and distance signals over a first predetermined range of values of said direction and distance signals, for defining at least a non-radial track with respect to said transmitting station.

2. Apparatus according to claim 1 in which said track computing means is further defined as also being responsive to said direction and distance signals over a second predetermined range of values of said direction and distance signals, for defining a radial track with respect to said transmitting station.

3. Apparatus according to claim 2 including means for indicating any departure of said mobile station from said non-radial or said radial tracks.

4. Apparatus according to claim 3 including means for controlling said track computing means such that, during approach of said mobile station toward said transmitting station, to change from said non-radial to said radial track at a predetermined distance from said transmitting station, said predetermined distance constituting a track inflection point.

5. Apparatus according to claim 4 in which said track computing means comprises; a first counter responsive to said received distance signal to produce a first analog output signal of amplitude proportional to the frequency of said distance signal, an amplifier for amplifying said first analog output signal by a factor which is a function of the distance from said transmitting station to said inflection point, first selector means responsive to said direction signal for producing a second analog output signal of polarity opposite that of said first analog output signal and having an amplitude proportional during said non-radial track to the frequency of said direction signal, an adder for adding said first and second analog output signals, second selector means for producing a third analog output signal of polarity opposite that of said second analog output signal and with amplitude proportional during said radial track to the frequency of said direction signal, and means responsive to the outputs of said adder and said second selector to change said track from non-radial to radial definition at said inflection point.

6. Apparatus according to claim 2 in which said defined track is a glide path.

7. Apparatus according to claim 2 in which said defined track is a runway azimuth approach path.

8. Apparatus according to claim 6 in which said transmitting station includes a single vertical antenna array of equally spaced elements excited by energy commutated among said elements, two separate receiving antennas spaced in the vertical plane are provided at said mobile station, means operative with one of said receiving antennas for determining the elevation angle of said mobile station, and means operative with both of said receiving antennas for determining the distance of said mobile station.

9. Apparatus according to claim 6 in which said transmitting station includes a vertical antenna array of equally spaced elements and a horizontal array of equally spaced elements, means for supplying energy commutated among said elements of both arrays, two separate receiving antennas spaced in the horizontal plane at said mobile station, means operative with one of said receiving antennas for determining the angle of elevation of said mobile station from the frequency of energy radiated by said vertical array, and means operative with both of said receiving antennas for determining the distance of said mobile station from the frequency of energy radiated by said horizontal array.

10. Apparatus according to claim 6 in which said transmitting station includes; a vertical array of equally spaced elements and two in-line horizontal arrays of equally spaced elements, means for exciting said vertical array with commutated energy, means for exciting both of said horizontal arrays with unidirectionally commutated energy; and said mobile station includes a single receiving antenna associated with means for determining the angle of elevation of said mobile station from the frequency of energy radiated by said vertical array, and means for determining the distance of said mobile station from the frequency of energy radiated by said two horizontal arrays.

11. Apparatus according to claim 7 in which said transmitting station has two in-line horizontal arrays of equally spaced elements extending normally on either side of the runway, means are included for exciting both of said horizontal arrays with unidirectionally commutated energy; and in which said mobile station includes a single receiving antenna associated with means for determining both distance and bearing of said mobile station from the frequency of energy radiated by both of said arrays.

* * * * *